2,588,505

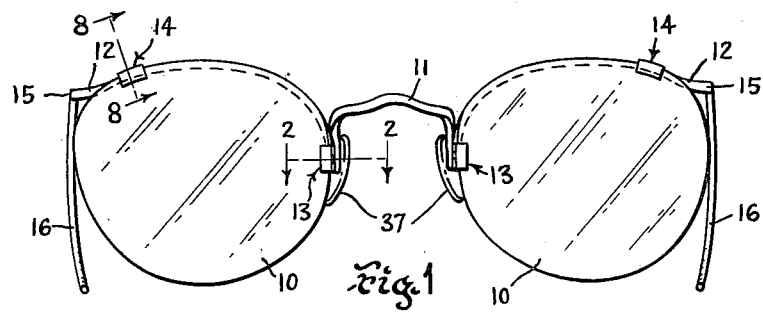
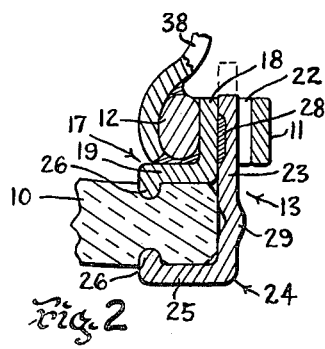
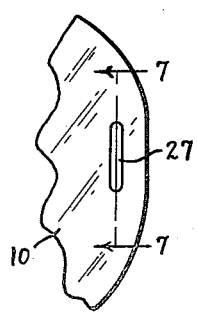
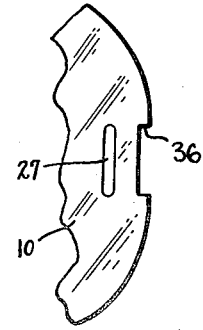
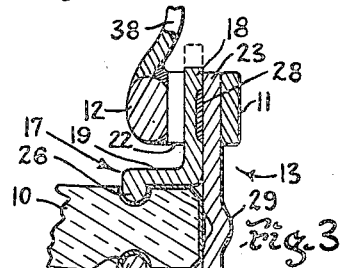
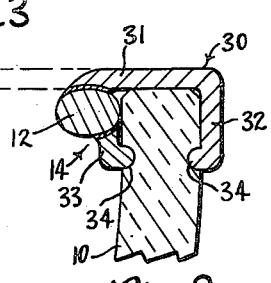
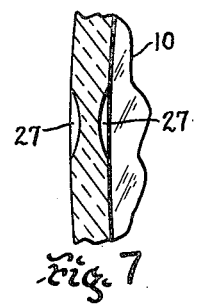
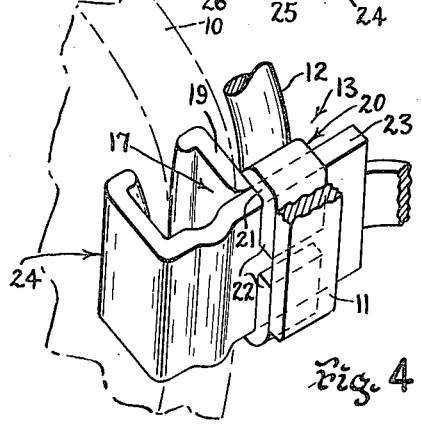
INVENTOR
CHARLES A. ELLIS Patented Mar. 11, 1952

UNITED STATES PATENT OFFICE 2,588,505

OPHTHALMIC LENS MOUNTING

Charles A. Ellis, Southbridge, Mass., assignor to American Optical Company, Southbridge, Mass., a voluntary association of Massachusetts Application April 7, 1949, Serial No. 85,961

2 Claims. (Cl. 88—47)

1

This invention relates to ophthalmic mountings and has particular reference to novel means and method for attaching lenses to the supporting structures of such mountings.

An important object of this invention is to provide novel means and method of attaching lenses to the supporting structure of an ophthalmic mounting, said means embodying a pair of connecting members, one of which is fixedly secured to the supporting structure and the other being movable with respect to the fixed member during assembly, each connecting member having a portion engaging respective slots or recesses formed in the opposed side surfaces of the lens, with the movable member being immovably secured to the fixed member after adjustment to the particular lens being supported.

Another object is to provide a device of the above character wherein the fixed member which is rigidly connected to the supporting structure is formed with a guideway in which the movable member is adapted to slide in being adjusted to fit the particular lens to be supported, with means such as a wad of solder or the like being carried between adjacent portions of said members whereby, after the members have been adjusted to the lens, heat may be applied to soften the solder and upon subsequent cooling the solder will securely connect the members.

Another object is to provide means and method of the above character for supporting the lenses of an ophthalmic mounting which is comparatively simple in construction, easily assembled, efficient in operation and relatively inexpensive to manufacture.

Other objects and advantages of the invention will become apparent from the following description taken in connection with the accompanying drawing in which:

Fig. 1 is a front elevational view of an ophthalmic mounting embodying the invention;

Fig. 2 is a fragmentary sectional view taken on line 2—2 of Fig. 1;

Fig. 3 is a view similar to Fig. 2 showing an alternative construction;

Fig. 4 is a fragmentary perspective view of one of the lens strap arrangements;

Figs. 5 and 6 are fragmentary views of a portion of a lens showing the slots or recesses formed therein;

Fig. 7 is a fragmentary sectional view taken on line 7—7 of Fig. 5; and

Fig. 8 is an enlarged fragmentary sectional view taken as on line 8—8 of Fig. 1 and looking in the direction indicated by the arrows.

2

Referring to the drawing, wherein like characters of reference designate like parts throughout the several views, the invention is directed to an ophthalmic mounting having means for supporting a pair of lenses 10 in spaced adjacent relationship and comprises a substantially rigid bridge member 11 and a pair of elongated arms 12 extending outwardly of the opposed sides of the bridge member. The arms 12 are formed preferably of relatively rigid or resilient material and are each shaped to follow the upper contour edge of the respective lenses 10 and are spaced slightly to the rear thereof, with the lenses 10 being secured to said arms in the nasal and temporal regions by novel connecting devices 13 and 14 respectively formed of metal or other desirable rigid material. The extreme end portions 15 of each of the arms 12 is shaped to extend outwardly and rearwardly of the adjacent lens 10 and has a temple 16 hingedly connected thereto.

Each of the nasal lens connecting devices 13 comprises a rear strap member 17 (Fig. 2) which is fixedly secured to a respective arm 12 adjacent the nasal end thereof and is formed from an initially flat member bent to a substantial L shape with the arm 12 being disposed within the bend and secured thereto as by solder or other suitable means. The strap 17 is mounted so that the stem portion 18 thereof will extend in a direction toward the lens 10 and the base portion 19 will overlie the rear surface of the lens.

The stem portion 18 of the strap 17 carries a guideway 20 which may be formed integral therewith or fixedly attached thereto. The guideway 20 is preferably formed of ear members extending from the opposed upper and lower edges of the stem portion 18, each of which ears has an intermediate portion 21 bent to extend in a direction away from the adjacent arm 12, with the extreme end portions 22 thereof further bent to extend toward one another and substantially parallel with the side surface of the stem 18. (Fig. 4). The end portions 22 will preferably be of such a length that they will nearly abut and have the adjacent end of the bridge member 11 fixedly secured thereto by solder or the like, the solder when applied and heated being adapted to flow between the ends of the portions 22 and substantially sealing the gap, thus forming a smooth continuous surface to which the bridge member is attached.

By forming the guideway 20 in this manner there is provided an opening into which the stem portion 23 of a front strap 24 is positioned, the strap 24 being shaped somewhat similar to the strap 17 and having its stem portion 23 resting against the stem portion 18 of the strap 17 and slidable thereupon in the guideway 20. The stem portion 23 of the strap 24, however, is of a length to extend over the adjacent edge of the lens 10 and carries an angled portion 25 which is adapted to overlie the outer side surface of the lens substantially parallel to the portion 19 of the strap 17 (Figs. 2 and 4).

The extreme ends of the portions 19 and 25 of the straps 17 and 24 are bent inwardly to form nibs 26 which are directed toward one another and are adapted to reside in elongated recesses 27 provided therefor in the opposed side surfaces of the lens 10 (Fig. 5).

One of the strap stem portions 18 or 23 is provided with a shallow recess in which resides a wad of solder 28 or other like heat softenable material, the recess and solder being provided in the surface to be engaged by the other strap stem portion.

Thus, in assembling a lens 10 to a supporting structure, the front strap 24 will first be drawn outwardly of the guideway 20 to space the strap portions 19 and 25 so that the lens 10 can be inserted therebetween. The rear surface of the lens 10 will be positioned against the portion 19 of the rear strap 17 so that the nib 26 will extend within the adjacent recess 27. The front strap 24 will then be adjusted so that its angled portion 25 will overlie the front surface of the lens 10 with its nib 26 extending within its respective recess 27. This will cause the stem portion 23 of the strap 24 to extend rearwardly as shown by dotted lines in Fig. 2.

To insure a firm grip of the lens 10 by the straps, the strap stem portion 23 may be provided with a raised area 29 which will introduce a certain amount of springiness in the strap. The assembler can grip the extended portion of the strap stem portion 23 with a tool provided for the purpose, and by pulling rearwardly can overcome the tension introduced by the raised area 29. Then, by applying heat to the unit while held in this relation, the solder wad 28 will become softened and upon cooling will form a bond between the two strap portions.

It is to be understood, however, that the lens connecting devices 13 may be modified whereby the guideways 20 may, if desired, be formed on or attached to the stem portions 23 of the front straps 24, as shown in Fig. 3. In such a construction the guideway strap portions 21 and 22, see Fig. 4, will be bent to form means for slidably receiving the stem portions 18 of the rear straps 17, and will be secured directly to the transverse arms 12, with the bridge member 11 being secured to the stem portion 23 of the front strap 24. The rear strap 17 thus can be moved to adjust the device to the particular lens to be supported, and, after adjustment, the straps 17 and 24 can be fixedly held in adjusted position by the wad of solder 28 similarly to be construction shown by Fig. 2.

After a lens has been assembled with the supporting structure as described, the extended portion of the movable straps, shown by dotted lines in Figs. 2 and 3, can be easily cut off to improve the appearance of the assembled mounting.

The temporal lens connecting devices 14 are preferably made as shown in Fig. 8 wherein a substantially L-shaped strap 30 has a relatively long stem portion 31 overlying the transverse arm 12 and the adjacent upper edge of the lens and has a portion 32 bent downwardly to overlie the front surface of the lens. The arm 12 also has a short strap 33 secured thereto and extending downwardly therefrom, with both straps 30 and 33 having nibs 34 engaging recesses in the adjacent side surfaces of the lens 10 similarly to the nibs 26 in the nasal connecting devices. When in adjusted position the portion 31 overlying the arm 12 is secured to said arm by soldering or the like. The excess length is adapted to be removed by cutting as described above. Thus, the lenses are not only partially supported by the temporal connecting devices 14, but are also restrained thereby from undesirable movement.

In accordance with the present invention, the recesses 27 which are formed in the front and rear surfaces of the lenses are preferably shaped to have a rounded bottom surface and straight side walls, substantially as shown in Figs. 5 and 7, and the nibs 26 or 34 as the case may be are shaped to comate with the recesses. Thus, there is provided a secure connection between the lenses and the straps whereby the lenses may be positively held. However, if desired, the recesses 27 may be coated with a layer 35 of adhesive or suitable cement (Fig. 3) for more securely retaining the nibs in said recesses. The coating 35 may, if desired, be of a resilient material such as rubber, latex, plastic or other desirable material to provide protection for the lenses, and may be applied to the entire lens surface and edge areas beneath the strap portions or only inwardly of the recesses as desired. Thus, the metallic parts of the connection will not be in direct contact with the glass.

To provide additional means for preventing rotation of the lenses about a horizontal axis, the lenses 10 may be provided with a notch 36 in which the stem portion 23 of the front strap 24 will reside (Fig. 6), the notch 36 being of a size and shape to permit the portion 23 to fit snugly therein and having flat inner surfaces in abutment with the surfaces of the portion 23, thus preventing rotary movement of the lenses which might occur in ophthalmic mountings such as the type wherein the lenses are supported only in the nasal regions of the structure. In addition to this function, when the strap stem portions 23 are within the notches 36, the outer surfaces thereof will be substantially flush with the adjacent edge surfaces of the lenses 10, thereby presenting a substantially smooth continuous visible surface which greatly enhances the appearance of the mounting. The notch 36 may be lined with a coating of adhesive or resilient cushioning means if desired.

Although not specifically mentioned hereinbefore, it is to be understood that an ophthalmic mounting constructed in accordance with the present disclosure will be provided with the usual nose pads 37 for supporting the mounting upon the face of the wearer, each nose pad being swively or rigidly secured to one end of a rearwardly extending adjustable nose pad arm 38, which arms are each fixedly connected as by solder or the like adjacent the nasal end of a respective transverse arm 12 (Figs. 1, 2 and 3).

From the foregoing it will be seen that there is produced novel means and method of a simple, efficient and economical nature for connecting lenses to the supporting structure of ophthalmic mountings which accomplish all of the objects and advantages of the invention.

While certain novel features of the invention have been shown and described and are pointed out in the annexed claims, it is apparent that various omissions, substitutions and changes in the formation and details of the device and in its use may be made by those skilled in the art without departing from the spirit of the invention.

I claim:

1. In a lens supporting structure for the lenses of an ophthalmic mounting having a marginally disposed recess in one surface thereof, means for securing lenses with said supporting structure comprising a pair of lens surface engaging strap-like members adapted to overlie the opposed surfaces of a respective lens and one having a projection to fit within said marginally disposed recess, the strap-like member overlying the front surface of the lens having a relatively flat end part angled therefrom to traverse the edge of the lens and extend rearwardly of the rear surface of said lens, and the other member also having a rearwardly extending end part, the rearwardly extending end part of one of said members being formed with an integral ear folded over said rearwardly extending end part to form a guideway having spaced substantially planal sidewalls with an entrant opening therebetween to receive the rearwardly extending end part of the other strap-like member, said end part of the latter strap-like member being slidably adjustable between said opposed substantially planal walls of the guideway to bring said members into clamping engagement with the opposed surfaces of the lens, and connection means carried by one of said end parts by which the other end part may be secured thereto to retain said end parts in the required adjusted relation to maintain the lens in assembled relation with the supporting structure.

2. In a lens supporting structure for the lenses of an ophthalmic mounting having a marginally disposed recess in one surface thereof, means for securing lenses with said supporting structure comprising a pair of lens surface engaging strap-like members adapted to overlie the opposed surfaces of a respective lens and one having a projection to fit within said marginally disposed recess, the strap-like member overlying the front surface of the lens having a relatively flat end part angled therefrom to traverse the edge of the lens and extend rearwardly of the rear surface of said lens, and the other member being secured to the supporting structure and having a rearwardly extending end part formed with an integral ear folded over said rearwardly extending end part in spaced relation thereto to form a guideway having opposed substantially planal walls with an entrant opening therebetween to receive said rearwardly extending end part of the first strap-like member, said end part of the first strap-like member being slidably adjustable between said opposed substantially planal walls of the guideway to bring said members into clamping engagement with the opposed surfaces of the lens, one of said rearwardly extending end parts having a recess, and heat softenable adhesive means provided in said recess to substantially the level of the surrounding surface whereby the end part of the first member may be adjusted between the opposed walls forming the guideway in the end part of the second member to bring said members into clamped relation with the lens on its opposed surfaces and by the application of heat be secured in said adjusted relation to maintain the lens in assembled relation with the supporting structure.

CHARLES A. ELLIS.

REFERENCES CITED

The following references are of record in the file of this patent:

UNITED STATES PATENTS

| Number | Name | Date |
|---|---|---|
| 710,550 | Zeiser | Oct. 7, 1902 |
| 720,859 | Trueblood | Feb. 17, 1903 |
| 781,258 | Winslow | Jan. 31, 1905 |
| 953,304 | Stevens | Mar. 29, 1910 |
| 972,053 | Boyd | Oct. 4, 1910 |
| 1,040,045 | Squier | Oct. 1, 1912 |
| 1,063,499 | Blackford | Jan. 3, 1913 |
| 1,145,077 | Newbold | July 6, 1915 |
| 1,200,150 | Styll | Oct. 3, 1916 |
| 1,256,327 | Kirstein | Feb. 12, 1918 |
| 1,963,297 | Eglinton | June 19, 1934 |
| 2,050,525 | Gagnon | Aug. 11, 1936 |
| 2,081,608 | Stolper | May 25, 1937 |
| 2,104,503 | Baker | Jan. 4, 1938 |
| 2,384,815 | Cozzens | Sept. 18, 1945 |
| 2,458,963 | Stevens | Jan. 11, 1949 |

FOREIGN PATENTS

| Number | Country | Date |
|---|---|---|
| 21,234 | Great Britain | of 1909 |
| 328,137 | Great Britain | Apr. 24, 1930 |